J. COCHRAN.
TRACTOR.
APPLICATION FILED MAR. 1, 1915. RENEWED DEC. 3, 1917.
1,268,324.
Patented June 4, 1918.
4 SHEETS—SHEET 4.
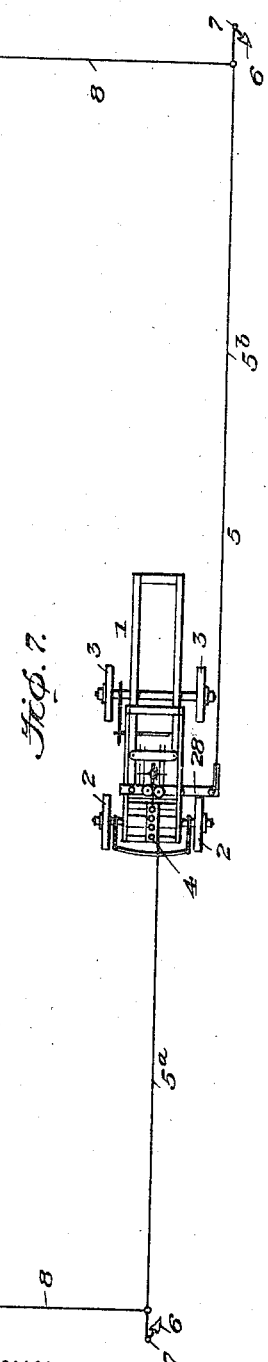

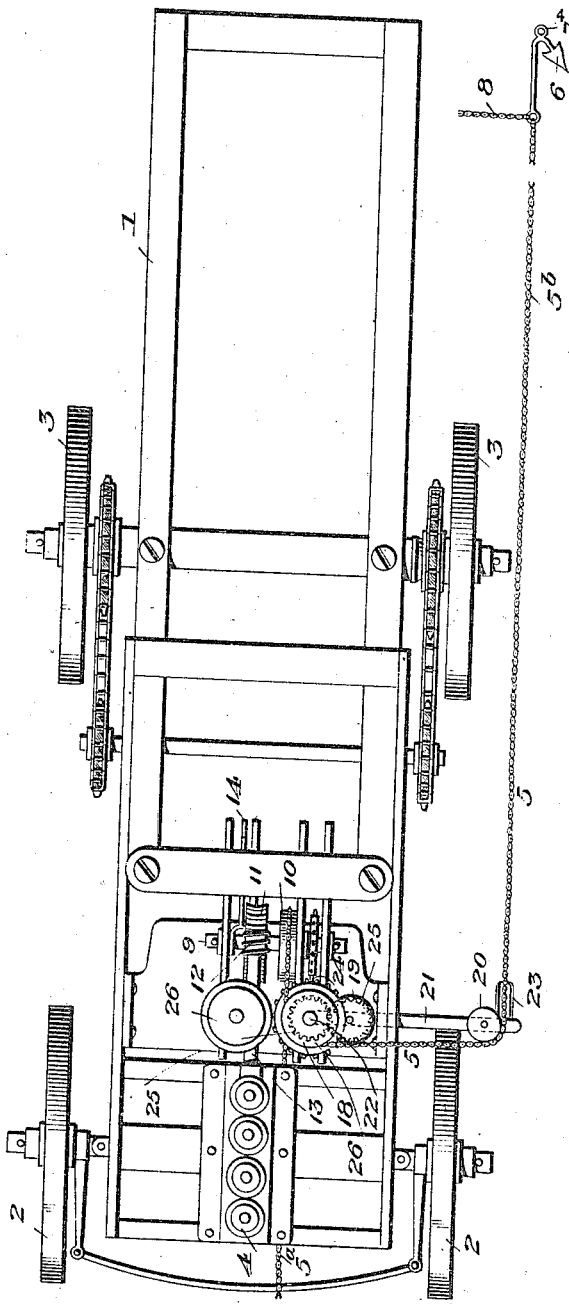

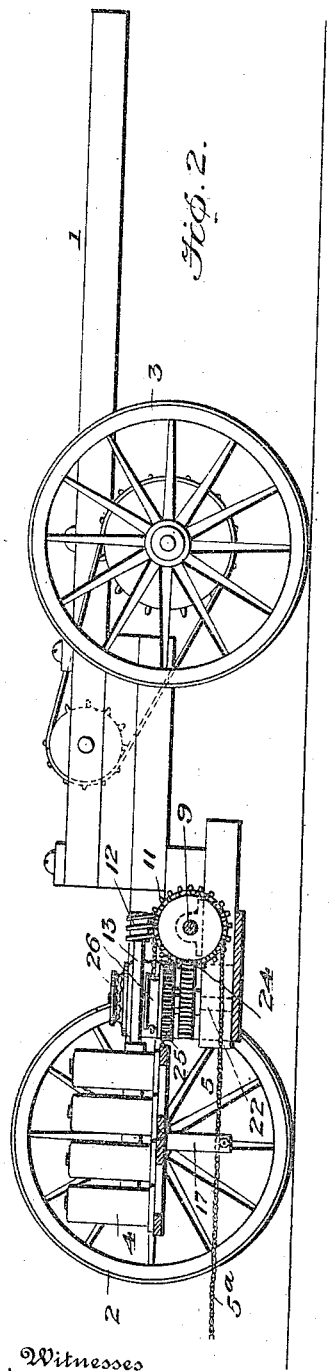

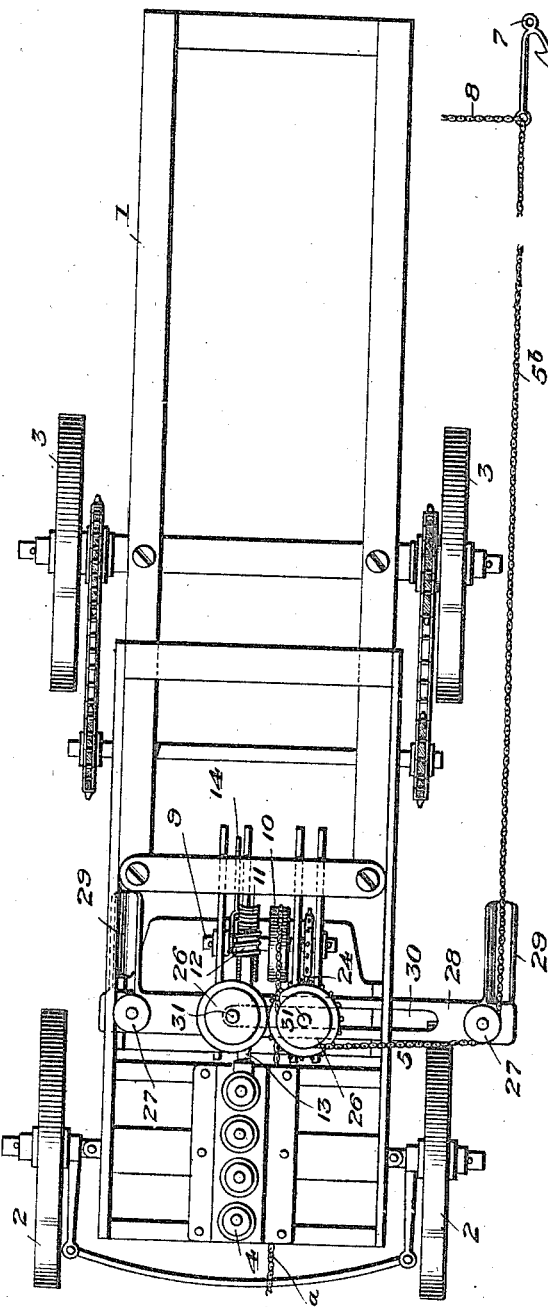

UNITED STATES PATENT OFFICE.

JOSEPH COCHRAN, OF NEW ORLEANS, LOUISIANA.

TRACTOR.

1,268,324.  Specification of Letters Patent.  Patented June 4, 1918.

Application filed March 1, 1915, Serial No. 11,312. Renewed December 3, 1917. Serial No. 205,237.

*To all whom it may concern:*

Be it known that I, JOSEPH COCHRAN, a citizen of the United States, residing at New Orleans, parish of Orleans, and State of Louisiana, have invented certain new and useful Improvements in Tractors, of which the following is a specification.

This invention relates to tractors.

The present invention relates to that type of tractor which is usually employed for drawing plows or cultivators across a field and receives its propulsion from a motor carried by the vehicle and means to draw upon or take up a cable, stretching across the field, and having its ends anchored. Heretofore tractors of this type have usually coöperated with a rope or cable which soon becomes frayed due to the action of the drum or winch which has a bight therearound.

While my invention particularly relates to tractors, it may be carried out in any farm implement, road scraper, or grading machine.

My object is to provide a tractor having improved means for coöperation with a chain stretched across a field, on the ground, wherein provision will be made for paying out the chain evenly and regularly behind the machine as it advances and preventing any bunching or massing of the chain after it has passed through the operating means; further, to provide improved means whereby, when the end of the stretch of chain is reached, the chain may be quickly and easily manipulated to permit reversal of the tractor; further, a general improved combination of parts and devices whereby the draft on the chain will be so applied that the chain will be disposed low down and relatively close to the surface of the ground and the leverage, applied downwardly through the machine toward the ground, will be minimized. Heretofore in tractors of this general type, the draft has been so arranged that the pull on the chain or cable has been the cause of a very great downward pressure being exerted through the tractor and onto the ground wheels, thus increasing the resistance to be overcome by the engine in drawing the tractor across the field. I dispose my draft mechanism so that the stretch of chain being pulled upon by the machine is disposed very low.

A further object is to provide improvements in the paying out mechanism whereby the chain may be paid out at one side or the other of the machine, according to the direction in which the machine is traveling and subject to adjustment, if desired, to the end that the idle stretch of chain will be laid on the ground outside the rear wheel of the machine.

The invention comprises certain improved features and novel combinations and adaptations of parts and mechanisms appearing more fully hereinafter, but I wish it understood that the specific construction hereinafter described and disclosed in the drawings is to be considered as illustrative, rather than restrictive, of the scope of the invention, as my invention is susceptible of modification within the spirit and scope thereof.

In the accompanying drawings:—

Figure 1 is a plan view;

Fig. 2, a side elevation;

Fig. 3, a perspective of the paying out mechanism;

Fig. 4, an edge view thereof;

Fig. 5, a plan view of a modification;

Fig. 6, a side elevation thereof;

Fig. 7, a diagrammatic view showing how the machine travels across a field;

Fig. 8, a detail plan view of a modified paying out mechanism;

Fig. 9, a section through the pocket sheave.

The frame 1 is carried by front steering wheels 2, controlled in any suitable manner and rear driving wheels 3 driven in any suitable manner from any suitable motor or engine 4 and they may be provided with any suitable differential.

Having discovered that an ordinary rope or cable has a very short life in connection with a tractor of the type to which my invention belongs, my improvements contemplate the use of mechanism adapted to coöperate with a chain 5 which may be of any ordinary kind. This chain is laid on the ground across the field which it is desired to cultivate or to be traversed by the tractor, as shown in Fig. 7, the ends of the chain being provided with any suitable anchors 6 which may have eyes 7 to receive a hook that may be let down from the tractor by hand or by a crane (not shown), for the purpose of raising the anchors and disposing them where desired. The branches 8 of the chain are the loose ends thereof:

the anchors may be connected to the extreme ends of the chain or inwardly from said ends. As the machine advances, it draws upon the stretch 5ª of the chain and pays out the stretch 5ᵇ behind it. Both stretches of the chain lie on the ground except where taken up by the machine.

Mounted in suitable bearings is a transverse shaft 9 which carries a pocket sheave 10 (Fig. 9) and a worm wheel 11 which is driven by a worm 12 on the engine shaft 13, thus affording the means for drawing upon the chain. The engine 4 may have any suitable operative connections, controlled by a clutch and lever, for causing the wheels 3 to be driven by the motor when the machine is taken from place to place and is not in use as a tractor in the manner shown in Fig. 7. Such disconnectible operating means for the wheels 3 is simply for the purpose of converting the machine into a traction engine for moving it from one field to another or from place to place and is not employed for propelling the machine across a field when cultivation is going on.

A suitable clevis or drawing device 14 is connected to the machine for the attachment of the plows or cultivators which are drawn along by it. As any desired plows or cultivators can be used and arranged in any preferred manner, such devices are not shown.

I have discovered that a pocket sheave such as shown in Figs. 8 and 9, and having pockets 15 for the accommodation of links of the chain that lie horizontally, with intervening narrow channels 16 for the accommodation of the links that lie vertically, is the only device which will properly engage a chain in a machine of this character and that an ordinary sprocket wheel will not serve the purpose satisfactorily. The stretch 5ª of the chain which is being pulled upon, comes in at the front of the machine below the engine 4 and at only a slight distance above the surface of the ground and is preferably supported by a sheave hanger 17 and it then runs rearwardly to the under side of the pocket sheave 10 and thence upwardly around the rear half of the circumference thereof and thence forwardly and around a smooth take-off sheave 18, and thence to another pocket sheave 19, Figs. 3 and 4, and finally, around an idler sheave 20 carried by an arm 21 which is pivotally mounted, as for instance, on the shaft 22 of the sheave 18 and may be held in any one of several positions to which it may be swung to dispose the paid out stretch 5ᵇ nearer to or farther from the frame 1. Any suitable means may be employed to hold the arm 21 in any one of its adjusted positions. A trough 23 is carried by the arm 21 and assists in laying the chain on the ground.

The shafts 9 and 22 are provided with any suitable gearing 24 for driving the shaft 22 from the shaft 9 and the pocket sheave 19 is driven from shaft 22 by gears 25. The gearing is so proportioned that the sheaves 10, 18 and 19 all revolve at the same speed. Modifications of this driving means could be resorted to. The use of the pocket sheave 19 in conjunction with the pocket sheave 10 insures the accurate taking off or paying out of the chain after it passes from the draft pocket sheave 10 and consequently, there is none of the bunching or massing up of the chain such as has been a very serious defect in previous machines employing a chain.

In order that the chain may be paid out from the other side of the machine, that is, from either side of the machine desired, I provide duplicate mechanisms such as shown in Figs. 3 and 4, of which there is shown in Fig. 1 only the sheave 18, the other parts being omitted. The sheave is driven and coöperates with the chain in the manner previously set forth and the parts, such as 24, 25, 19, 21, 20, and 23 are duplicated. The engine shaft being below the sheave 18 last mentioned, when the tractor is returning (as from left to right, for instance, Fig. 7) the chain 5ᵇ is then taken off of the sheave 18 and displaced from the position shown in Fig. 1 and transferred to the other sheave 18 and to the mechanism at the other side of the machine corresponding to the mechanism of Figs. 3 and 4, but the chain is still drawn upon by the same pocket sheave 10.

Referring to Fig. 5, showing a modification of the paying out mechanism, the chain 5ᵇ, after leaving the pocket sheave 10 passes around a pocket sheave 26 which positively takes it off the pocket sheave 10, and then passes to an idler sheave 27 carried by a laterally slidable frame 28 having a trough 29 down which the chain passes. The other end of the frame 28 carries duplicates of the sheave 27 and trough 29. The frame has a slot 30 through which the shafts of the take-off sheaves pass. As in Fig. 1, a duplicate take-off sheave 26 is provided so that the chain can be engaged with either one of the sheaves 26 and either one of the sheaves 27. The shaft 9 drives the shafts of the sheave 26 in unison with said shaft 9 so that the chain is taken off by a sheave 26 at exactly the speed it is passing around the draft sheave 10.

In Fig. 8, I have shown how the sheave 26 may be mounted loose on its shaft 31 and connected thereto by a spring 32 so that it can have a slight rotation on said shaft when freed therefrom. The sheave is positively connected to the shaft, for driving purposes, by opposite ratchet wheels 33 and 34 and a double pawl composed of the pawls 35 and 36 independently mounted on pivot 37 and connected by spring 38 which tends to throw them into engagement with the ratchet wheels 33 and 34. The ratchet wheels are carried by the shaft 31 and the pawls by the pocket sheave 26. By pressing together the outer ends of the pawls they are released from the ratchet wheels, whereupon the sheave 26 is only connected to the shaft 31 by the spring 32 which permits of slightly turning the sheave 26 by hand to position it so that the stretch of chain between it and the sheave 10 will be tightened. The construction in question is simply employed for purpose of taking up any slack in the chain intervening between sheaves 10 and 26.

In the claims, in referring to a "pocket sheave," either as a draft sheave or a take-off sheave, or the combination of two such sheaves, I intend to cover a sheave having pockets and intervening channels adapted to receive the links of the draft chain substantially as shown in Figs. 8 and 9, subject to such variations as fall within the scope of such a sheave, as distinguished from a mere sprocket wheel having projecting teeth adapted to enter the links of the chain.

Having thus described my invention, what I claim as new and desire to secure by Letters Patent, is:—

1. In a tractor, draft mechanism comprising a chain, a draft pocket sheave having pockets and intervening channels, and a take-off sheave, said sheaves coöperating with the chain, and means for driving the said sheaves at the same speed.

2. In a tractor, draft mechanism comprising a chain, a draft pocket sheave having pockets and intervening channels, and a take-off pocket sheave having pockets and intervening channels, said sheaves coöperating with the chain, and means for driving the said sheaves at the same speed.

3. In a tractor, draft mechanism comprising a chain, a draft pocket sheave having pockets and intervening channels, and independent take-off pocket sheaves each having pockets and intervening channels, said take-off sheaves being arranged to direct the chain to opposite sides of the tractor and said pocket sheave engaging the chain for draft purposes and said chain being adapted to be passed over either one of the take-off pocket sheaves according as it is desired to take off the chain to one side or the other, and idlers respectively adapted for the passage of the chain thereover according to which of the take-off sheaves is employed.

4. In a tractor, draft mechanism comprising a chain, and a draft pocket sheave coöperating therewith, said sheave having pockets and intervening channels.

5. In a tractor, draft mechanism comprising a chain, a draft pocket sheave having pockets and intervening channels, and a pocket take-off sheave having pockets and intervening channels whose axis is disposed at an angle to the axis of the draft sheave, and means for driving the said sheaves at the same speed, said sheaves coöperating with the chain.

6. In a tractor, draft mechanism comprising a chain, a draft pocket sheave having pockets and intervening channels, and take-off means for the chain comprising a sheave mounted to be moved inwardly or outwardly to different positions of lateral adjustment in relation to the tractor and draft pocket sheave for the purpose of laying the chain at different points in relation thereto.

In testimony whereof, I hereunto affix my signature in presence of two witnesses.

JOSEPH COCHRAN.

Witnesses:
S. V. LOCKWOOD,
C. A. NEALE.

Copies of this patent may be obtained for five cents each, by addressing the "Commissioner of Patents, Washington, D. C."